United States Patent
Marchi et al.

(10) Patent No.: US 8,574,359 B2
(45) Date of Patent: Nov. 5, 2013

(54) HIGH PERFORMANCE SULFO-ALUMINOUS CLINKER

(75) Inventors: Maurizio Iler Marchi, Melzo (IT); Stefano Allevi, Scanzorosciate (IT)

(73) Assignee: Italcementi, Bergamo (IT)

( * ) Notice: Subject to any disclaimer, the term of this patent is extended or adjusted under 35 U.S.C. 154(b) by 0 days.

(21) Appl. No.: 13/885,252

(22) PCT Filed: Nov. 15, 2011

(86) PCT No.: PCT/EP2011/070116
§ 371 (c)(1),
(2), (4) Date: May 14, 2013

(87) PCT Pub. No.: WO2012/065976
PCT Pub. Date: May 24, 2012

(65) Prior Publication Data
US 2013/0233207 A1      Sep. 12, 2013

(30) Foreign Application Priority Data

Nov. 15, 2010   (IT) .......................... MI2010A002110

(51) Int. Cl.
  *C04B 7/32*   (2006.01)
  *C04B 7/36*   (2006.01)

(52) U.S. Cl.
  USPC ........................... 106/693; 106/692; 106/695

(58) Field of Classification Search
  USPC .......................................... 106/692, 693, 695
  See application file for complete search history.

(56) References Cited

U.S. PATENT DOCUMENTS

| | | | | |
|---|---|---|---|---|
| 3,155,526 A * | 11/1964 | Klein | ........................... | 106/735 |
| 3,857,714 A * | 12/1974 | Mehta | ........................... | 106/735 |
| 3,860,433 A * | 1/1975 | Ost et al. | ........................... | 106/765 |
| 4,798,628 A * | 1/1989 | Mills et al. | ........................... | 106/692 |
| 6,113,684 A * | 9/2000 | Kunbargi | ........................... | 106/692 |
| 6,695,910 B2* | 2/2004 | Classen et al. | ........................... | 106/739 |
| 7,001,454 B2* | 2/2006 | Lopez-Gonzales et al. | .. | 106/739 |
| 7,850,776 B2* | 12/2010 | Gartner et al. | ........................... | 106/692 |
| 7,998,267 B2* | 8/2011 | Gartner et al. | ........................... | 106/692 |
| 8,177,903 B2* | 5/2012 | Walenta et al. | ........................... | 106/695 |
| 8,268,071 B2* | 9/2012 | Pasquier et al. | ........................... | 106/693 |
| 8,317,915 B2* | 11/2012 | Walenta et al. | ........................... | 106/695 |
| 2007/0266903 A1* | 11/2007 | Gartner et al. | ........................... | 106/693 |
| 2013/0118384 A1* | 5/2013 | Barnes-Davin et al. | ...... | 106/815 |
| 2013/0152825 A1* | 6/2013 | Ramirez Tovias et al. | ... | 106/693 |

FOREIGN PATENT DOCUMENTS

| | | | |
|---|---|---|---|
| DE | 19644654 A1 | | 4/1998 |
| EP | 1171398 A1 | | 1/2002 |
| EP | 1306356 A1 | | 5/2003 |
| EP | 1428804 A2 * | | 6/2004 |
| FR | 2277052 A1 | | 1/1976 |
| FR | 2940274 A1 * | | 6/2010 |
| FR | 2940275 A1 * | | 6/2010 |
| FR | 2941448 A1 * | | 7/2010 |
| WO | WO 2011151608 A1 * | | 12/2011 |
| WO | WO 2011158109 A1 * | | 12/2011 |
| WO | WO2012065976 A1 * | | 5/2012 |

OTHER PUBLICATIONS

Derwent-Acc-No. 2012-M68090, abstract of Chinese Patent Specification No. CN 102584045 A (Jul. 2012).*
Chemical Abstracts, vol. 111, No. 6, Feb. 1, 1990.
Buzzi, L. et al., "High-performance and low-CO2 cements based on calcium sulphoaluminate," ZKG International, Bauverlag BV., [2010].
Marroccoli, M., et al., "Synthesis of Caclium Sulfoaluminate Cements From A1203-Rich By-products From Aluminium Manufacture," 2nd International Conference on Sustainable Construction Materials and Technologies Jun. 28-30, 2010.
International Search Report for PCT/EP2011/070116 dated Mar. 8, 2012 (4 pages).

* cited by examiner

*Primary Examiner* — Anthony J Green
(74) *Attorney, Agent, or Firm* — Abelman, Frayne & Schwab

(57) ABSTRACT

The invention relates to a sulfo-aluminous clinker with optimal setting time and short term compressive strengths, comprising a mixture of the following phases: —calcium sulfoaluminate, or $C_4A_3\$$, in amounts higher than 50% by weight of the mixture, —belite, or C25, in amounts between 2 and 23%, —3C25 3C\$ $CaX_2$, X being fluorine or chlorine, between 3 and 15% —$C_{11}A_7CaX_2$, X being fluorine or chlorine, between 2 and 12%, both fluorine and chlorine being altogether present in the mixture, and phase $C_5S_2\$$ being absent. The invention also relates to a method for preparing this sulfo-aluminous clinker, and hydraulic binders comprising this clinker.

18 Claims, 5 Drawing Sheets

HIGH PERFORMANCE SULFO-ALUMINOUS CLINKER

RELATED APPLICATIONS

This application is a §371 of PCT/EP2011/070116 filed Nov. 15, 2011 and claims priority from Italian Patent Application No. MI2010A002110 filed Nov. 15, 2010, both incorporated by reference in their entirety.

FIELD OF THE INVENTION

In recent years the level of atmospheric $CO_2$ emissions has increased considerably and continues to grow rapidly, contributing substantially to climate changes. The cement industry contributes significantly to these emissions, producing about 5%. For this reason, different initiatives have been adopted in order to reduce the environmental impact of cement production.

PRIOR ART

In the production of concrete, hydraulic binders are generally used, obtained from Portland clinker. These clinkers are produced using a finely ground mixture of limestone, clay, silica and iron oxides heated to a temperature of over 1400° C. in rotary furnaces.

The fired mixture, or clinker, which is obtained in the form of hard nodules, is cooled and ground with calcium sulfate and other minerals to obtain the hydraulic binder, or Portland cement.

In Portland cements, the reactivity, above all in the short term, is linked to the amount of alite, a solid solution of tricalcium silicate (conventionally abbreviated to $C_3S$) of the clinker, which in current cements must generally be higher than 50% to comply with the specifications described in legislations. To obtain this clinker the starting mixture must contain high amounts of limestone.

The $CO_2$ emissions linked to the production of Portland cement can be separated into two main categories: emissions caused by the composition of the raw materials; emissions inherent to the production process caused by the consumption of energy and fuel.

Therefore, to reduce $CO_2$ emissions on the one hand the content of limestone in the raw materials should be reduced, thereby limiting performances (this is the case of belite cements), or systems other than Portland cement should be considered.

Instead, reducing the energy consumption required for production would cause a reduction in the firing temperature or an increase process efficiency. Various methods have been considered in this regard, such as the use of mineralizers suitable to reduce the clinkering temperature. Also in this case systems other than Portland can be considered.

Recently, the ECRA (European Cement Research Academy) drew up a document entitled "Development of State of the Art-Techniques in Cement Manufacturing: Trying to Look Ahead", commissioned by the CSI (Cement Sustainability Initiative) a member of the World Business Council for Sustainable Development (WBCSD), which takes into consideration all currently available technologies suitable to significantly reduce $CO_2$ emissions in the production of cement.

Among the various solutions, cements based on calcium sulfoaluminate, or CSA, the category forming the subject matter of the present invention, were considered interesting.

In this regard, some of the standard abbreviations used in the cement industry are set down below, as they are used in the present description as glossary also with reference to the present invention.

Glossary
 C means CaO
 S means $SiO_2$
 A means $Al_2O_3$
 F means $Fe_2O_3$
 $ means $SO_3$
 T means $TiO_2$
 M means MgO This type of cement, developed in China for over 30 years, is characterized by the presence of a phase in fact defined as calcium sulfoaluminate or $C_4A_3\$$, also known as Klein's compound or ye'elimite. The other phases present are generally $C_2S$, $C_4AF$, CA, $CA_2$, $C_{12}A_7$, C$ and free lime.

The starting raw materials used to prepare CSA are a source of lime (CaO), usually limestone, a source of sulfate ($SO_3$) usually natural gypsum or by-products of other processes, such as phosphogypsum, a source of alumina ($Al_2O_3$), usually high or low grade bauxite, depending on the $Al_2O_3$ content, kaolin or other by-products such as blast furnace slag, fly ash. Generally, these are produced in conventional rotary furnaces.

Numerous examples of production of sulfo-aluminous cements for different applications have been proposed, using different starting raw materials.

The U.S. Pat. No. 3,155,526 (Klein), describes expansive binders produced from sulfo-aluminous clinker constituted by $C_4A_3\$$ and high amounts of CaO.

The U.S. Pat. No. 4,798,628 (Mills) describes the production and use of a sulfo-aluminous clinker particularly rich in alumina which contains from 15-68% of $C_4A_3\$$, and important contents of other phases of the aluminous cement such as CA, $CA_2$ and $C_2AS$. The free lime content is maintained below 1%.

The U.S. Pat. No. 6,695,910 (Classen) describes the preparation of a sulfo-aluminous clinker containing more than 55% of $C_4A_3\$$, more than 10% of belite ($C_2S$) and less than 10% of C$ (Anhydrite) where the iron content ($Fe_2O_3$) is maintained very low (up to 0.3%) with the object of obtaining a light coloured clinker for use in white binders. Also in this case the free lime content is maintained very low (<0.5%).

In these cases it is necessary to use high quality and high grade bauxite to maintain low silica and iron contents. The firing temperature must be high (>1300° C.).

The sulfo-aluminous clinkers developed by CBMA (China Building Materials Academy), regulated by a series of national standards and also known as Third Cement Series (TCS), were described by Zang L. et al in the review "Advances in Cement Research", Volume 11, 1, 1999. These are generally constituted by $C_4A_3\$$, $C_2S$ and $C_4AF$. Depending on the $C_4AF$ content, they are divided into sulfo-aluminous ($C_4AF$ between 3-10%) and ferro-aluminous ($C_4AF$ between 15-25%). The starting raw material is generally bauxite with variable iron content depending on the type of product. In the case of high iron contents, the production of these clinkers in conventional rotary furnaces is difficult given the highly melting effect of the iron which causes deposits to form in the furnace, which lead to the complete clogging thereof.

There are also examples of sulfo-aluminous cements, called sulfobelite cements, in which the $C_4A_3\$$ content is maintained at values below 50%, permitting the use of lower amounts of bauxite or the use of less noble raw materials such as clays and kaolins.

The U.S. Pat. No. 3,860,433 (Ost) describes a cement with high initial strength and rapid setting constituted by 20 to 40% of $C_4A_3\$$, 10-35% of $C\$$ and belite ($C_2S$) produced using kaolins.

Similarly, the U.S. Pat. No. 3,857,714 (Mehta) describes a sulfo-belite cement with composition similar to that of Ost but with a higher iron content, which leads to the formation of between 15-20% of $C_4AF$. These cements have similar performances to Portland cement, therefore are not comparable to the Chinese ones.

Another example of sulfo-belite clinker, with high iron content, is described in the patent US 2007/0266903 (Gartner), where to overcome the problem of poor development of the strengths of the cements an activator such as boron is used, added to the raw materials in the form of borax to allow stabilization of the high temperature alpha' form of the belite, which according to this patent is more hydraulically active. In this case, the composition is 10-20% of $C_4AF$, 20-30% of $C_4A_3\$$, 14-65% of $C_2S$ preferably in the alpha' form.

Moreover, there are examples of use of processing waste as raw materials in total or partial substitution of the limestone, bauxite or gypsum. An example is given by Arjunan P. in "Cem. Concr. Res." 29 (1999) pp. 305-1311, where fly ash is used. Another example is given by Singh M. in "Journal of Hazardous Materials" 157 (2000) pp. 106-113, where waste from the production of fertilizers is used in substitution of the gypsum and fly ash.

In all these cases, given the low alumina content of the raw materials, it is possible only to obtain sulfo-belite clinkers with low $C_4A_3\$$ contents and therefore with limited performances.

The U.S. Pat. No. 6,113,684 (Kunbargi) also describes a clinker produced using phosphogypsum as raw material, but in any case containing bauxite. According to this patent, the use of phosphogypsum allows a clinker to be obtained that simultaneously contains $C_4A_3\$$, $C_5S_2\$$ and $3C_2S\ 3C\$\ CaX_2$, which makes this clinker more reactive than the analogue without phosphogypsum. However, also in this case, the reactivity of the clinker is much lower, as according to this patent, in order to obtain hydraulic activity, it must be mixed with at least 60% of Portland cement.

Recently, an article by Marroccoli et al, presented at the 2nd Int. Conference on sustainable Construction Materials Technology (28-30 Jun. 2010—Univ. Politecnica delle Marche), described the synthesis of a sulfo-aluminous clinker using by-products from the aluminium industry in partial or total substitution of bauxite; the article reveals how in this manner the $C_4A_3\$$ formation speed is increased and the optimal synthesis temperature of this phase can be reduced from 1350 to 1250° C. The clinker produced is mainly composed of $C_4A_3\$$, $C_2S$, anhydrite ($C\$$), $C_4AF$, $C_5S_2\$$, $C_3A$ and $C_{12}A_7$.

SUMMARY OF THE INVENTION

The object of the present invention is to provide a sulfo-aluminous clinker with high $C_4A_3\$$ content, of between 50-70%, with optimal setting times, with rapid development of strength and high short term compressive strengths.

To achieve this object, and other advantages which will be described below, the present invention proposes a sulfo-aluminous clinker with optimal setting time and short term compressive strengths, comprising a mixture of the following phases:
  calcium sulfoaluminate, or $C_4A_3\$$, in amounts higher than 50% by weight of the mixture,
  belite, or $C_2S$, in amounts between 2 and 23%,
  $3C_2S\ 3C\$\ CaX_2$, X being fluorine or chlorine, between 3 and 15%
  $C_{11}A_7CaX_2$, X being fluorine or chlorine, between 2 and 12%, both fluorine and chlorine being altogether present in the mixture, and phase $C_5S_2\$$ being absent.

In a preferred embodiment, the mixture comprises $3C_2S3C\$\ CaF_2$ and $C_{11}A_7CaCl_2$.

In a different preferred embodiment, the mixture comprises $3C_2S3C\$CaF_2$, $C_{11}A_7CaCl_2$ and $C_{11}A_7CaF_2$.

However, mixtures of these two phases, each with variable contents of X=F or Cl, are possible, in any case respecting the condition that both fluorine and chlorine are altogether present in the final mixture of the clinker.

In a preferred embodiment, the clinker according to the invention comprises a total amount between 5 and 25% by weight of said phases $3C_2S3C\$CaX_2$ and $C_{11}A_7CaX_2$.

The clinker according to the invention can also comprise a total amount between 0.01 and 10% by weight of one or more of the following phases: calcium sulfate or anhydrite ($C\$$), calcium aluminates ($CA$, $CA_2$, $C_3At$), gehlenite ($C_2AS$), perovskite ($CT$), calcium iron titanate (or $CFT$), merwinite (or $CMS_2$), periclase, free lime, ferrite ($C_4AF$ or $C_2F$).

In a preferred embodiment, a clinker according to the invention comprises the following composition: calcium sulfoaluminate or $C_4A_3\$$ from 52% to 72%; from 5 to 18% of belite or $C_2S$; from 6 to 12% of $3C_2S\ 3C\$\ CaX_2$ with X=fluorine, from 2 and 8% of $C_{11}A_7CaX_2$ with X=chlorine.

The clinker according to the invention preferably has the following composition in main oxides:
  CaO between 30-45%, preferably between 35-45%
  $Al_2O_3$ between 20-35%, preferably between 27-33%
  $Fe_2O_3$ between 0.1-5%, preferably between 1-3%
  $SiO_2$ between 5-10%, preferably between 5 e 7%
  $SO_3$ between 10-18%, preferably between 12 e 15%,
  and in secondary oxides:
  MgO between 0.1-6%, preferably between 3-5%
  $TiO_2$ between 0.1-3%, preferably between 1-3%
  $Na_2O$ between 0.05-1% preferably between 0.1-0.8%
  $K_2O$ between 0.05-1% preferably between 0.1-0.8%
  $P_2O_5$ between 0.05-0.5%, preferably between 0.1-0.3%
  SrO between 0.05-1%,
  and can also comprise Mn Fluorine and chlorine are also present, distributed in said phases $3C_2S\ 3C\$\ CaX_2$ and $C_{11}A_7CaX_2$.

In the final clinker the fluorine is preferably between 0.01-1%, more preferably between 0.1-0.8%. The chlorine is preferably between 0.01-1%, more preferably between 0.1-0.6%.

They are added to the starting mixture in the form of components of the same raw materials used, for example alumina, or added specifically, for example in the form of fluorite, calcium chloride, sodium chloride, potassium chloride or mixtures thereof.

The invention also relates to a method for producing sulfo-aluminous clinker as defined above, comprising the stage of subjecting a starting mixture comprising a bauxite-free mixture comprising alumina to firing at a temperature not above 1200° C. Preferably this alumina comes from the production of secondary aluminium.

This starting bauxite-free mixture comprising alumina can also comprise limestone, silica, natural gypsum.

According to the invention, the clinker can be obtained by firing a starting mixture also comprising one or more substances selected from dolomite, marl, clay, kaolin, chemical gypsum, phosphogypsum, fluorogypsum and fluorite.

Said starting mixture is preferably subjected to a stage of pre-calcination prior to firing.

In a preferred embodiment at industrial level, the raw materials are appropriately ground and mixed and then subjected to firing in a rotary furnace.

In a different embodiment, the method according to the invention comprises the stages in which said mixture is treated:

a) grinding limestone, silica, natural gypsum and alumina up to a determined grain-size distribution,
b) mixing the components with water to obtain a fluid mortar,
c) drying such a mortar,
d) subjecting the dried mortar to said stage of pre-calcination at 950° C.,
e) subjecting the pre-calcined mixture to firing at a temperature not above 1200° C.

According to the invention, firing of the starting mixture takes place in a temperature range between 1000 and 1200° C. The choice of the firing temperature is fundamental to be able to stabilize, in the final clinker, the phases characterizing the clinker of the present invention, in particular the phase $3C_2S$ $3C\$$ $CaX_2$, without excessively influencing the content of the phase $C_4A_3\$$.

$3C_2S$ $3C\$$ $CaX_2$, defined fluorellestadite o chloroellestadite depending on whether X is fluorine or chlorine, is stabilized by the presence of fluorine or chlorine and sulfates. Fluorellestadite is a phase with a structure similar to apatite, stable up to 1240° C., a temperature at which it melts inconsistently to form $C_2S$ and liquid. It can form solid solutions with the phase ternesite having the formula $C_5S_2\$$, also called sulfospurrite, sulfated analogue of the phase silicocarnotite. This phase is commonly present in sulfo-aluminous clinkers.

According to the invention, the controlled firing temperature conditions and the presence of halogens in the mixture (fluorine and/or chlorine) permit stabilization of the fluorellestadite $3C_2S$ $3C\$$ $CaX_2$ eliminating the phase ternesite $C_5S_2\$$, with the result of obtaining high performances of the final clinker.

Another favourable consequence of stabilization of the phase fluorellestadite according to the invention is that of trapping in this phase the fluorine, thereby preventing the formation of fluoroaluminate, or $C_{11}A_7CaF_2$, and instead promoting the formation of the chlorinated analogue $C_{11}A_7CaCl_2$. The fluoroaluminate $C_{11}A_7CaF_2$ is a very reactive phase, present in jet cements. It is the corresponding fluorinated analogue of $C_{12}A_7$ or mayenite. Usually, the presence of mayenite o $C_{12}A_7$ in sulfo-aluminous clinkers implies uncontrolled hardening times, so by minimizing the content thereof the invention also solves this problem.

Another important aspect linked to the choice of temperature in the method according to the invention relates to control of the loss of sulfates due to evaporation as $SO_2$, which in the mixture considered in the present invention could become significant if the temperature were to exceed 1200° C. This loss of sulfates would cause a drastic reduction in the $C_4A_3\$$ content in the clinker, which would drop below 50%, and therefore outside the scope of the present invention.

Firing at a temperature not above 1200° C. (100-200° C. lower than those used in the prior art to produce sulfo-aluminous clinker; 300-400° C. lower than those usually required to prepare Portland cements) required to prepare the clinker of the present invention allows a drastic decrease in fuel consumptions, considerably reducing $CO_2$ emissions.

The invention also relates to a hydraulic binder comprising a mixture of a clinker as defined above with calcium oxide (for example Portland cement) and/or calcium sulfate (for example anhydrite and/or gypsum).

According to the proportions of these three main components it is possible to obtain binders with different properties.

Preferably, the clinker according to the invention must be milled until obtaining a specific surface area (Blaine) higher than 3000 cm²/g, preferably higher than 4000 cm²/g.

BRIEF DESCRIPTION OF THE DRAWINGS

Characteristics and advantages of the compositions according to the present invention are illustrated in detail in the description below, also with reference to the graphs of FIGS. 1 to 4 of the accompanying drawings, which show the diffractograms of the same number of samples of clinker produced according to the detailed description below.

DETAILED DESCRIPTION OF THE INVENTION

Figure 1:
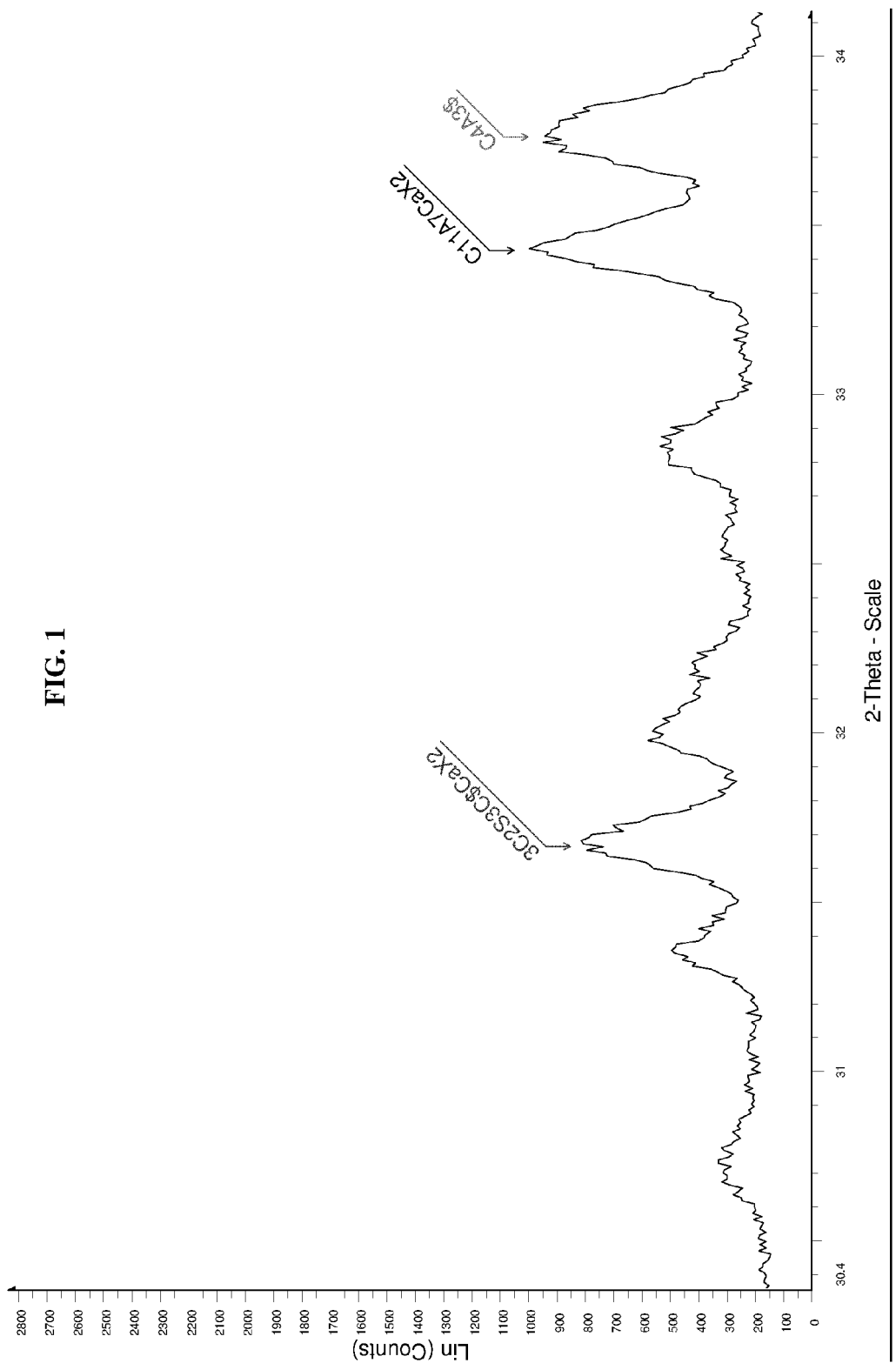
FIGS. 1, 2 and 3 show diffractograms of the same number of samples of clinker according to the invention.

The following examples are in this respect provided purely by way of non-limiting illustration of the present invention.

Example 1

Analytic Techniques for Characterization of the Sulfo-Aluminous Clinker According to the Invention The sulfo-aluminous clinkers produced according to the invention were characterized through X-ray Fluorescence Spectroscopy (XRF), X-ray Diffraction (XRD) and Scanning Electron Microscopy (SEM) analysis. XRF analysis allows identification of the chemical elements constituting a material and of the main oxides.

The quantity of CL ions and F ions were also determined chemically.

The stabilized phases during the firing process, responsible for the performances of the clinker, require specific characterization. This characterization is obtained through X-ray diffractometry (XRD) analysis of powders.

The samples were subjected to XRD analysis using a conventional diffractometer with Bragg-Brentano geometry.

The diffraction spectra were collected in the range from 5° to 70° of 2-Theta (copper radiation) with a scanning step of 0.01 and count times of 2s for each step. The spectra thus obtained were analyzed using a software that allows characterization of the samples in terms of association of phases.

Identification takes place through recognition of the positions and of the relative intensities of the characteristics peaks of each phase using the database of known structures, the Powder Diffraction File (PDF-2) by the International Centre for Diffraction Data (ICDD).

The database references useful for identification of the phases present in the samples of clinker according to the invention are summarized in the Table 1 below:

TABLE 1

| Name of the mineral/phase | Full formula | PDF Number |
| --- | --- | --- |
| Ye'elimite/$C_4A_3\$$ cubic | $Ca_4Al_6O_{12}SO_4$ | 033-0256 |
| $C_4A_3\$$ orthorhombic | $Ca_4Al_6O_{12}SO_4$ | 085-2210 |
| Larnite β-$C_2S$ | $Ca_2SiO_4$ | 033-0302 |
| Fluorellestadite ($3C_2S$ $3C\$$ $CaF_2$) | $Ca_{10}(SiO_4)_3(SO_4)_3F_2$ | 045-0009 |
| Anhydrite/$C\$$ | $CaSO_4$ | 037-1496 |

TABLE 1-continued

| Name of the mineral/phase | Full formula | PDF Number |
|---|---|---|
| Ternesite ($C_5S_2\$$) | $Ca_5(SiO_2)_2SO_3$ | 070-1847 |
| Periclase/MgO | MgO | 045-0946 |
| $C_{11}A_7CaF_2$ | $Ca_{12}Al_{14}O_{32}F_2$ | 087-2492 |
| CFT | $Ca_3TiFe_2O_8$ | 084-2068 |
| Merwinite/$CMS_2$ | $CaMg(SiO_4)_2$ | 035-0591 |
| $C_4AF$ | $Ca_2(Al,Fe)_2O_5$ | 030-0226 |

The samples were also observed under the Scanning Electron Microscope (SEM) provided with an Energy Dispersion Spectrometer (EDS) for elemental microanalysis. The combined XRD and EDS analysis allows the presence of a phase to be unequivocally defined and characterized in terms of composition, identifying the presence of minor substituting elements or defining any solid solutions present.

Observation under the electron microscope also allows a description of the materials being analyzed from the viewpoint of texture and morphology. Different morphologies and dimensions of the stabilized phases can in fact determine a different reactivity of the clinker produced.

Complete characterization of the materials being analyzed can be obtained through refinement of the diffraction profiles obtained through XRD using the Rietveld method (Rietveld H. M., J. Appl. Cryst., 2, 65-71, 1969).

This method allows quantification of the phases present in the material without the need to use standards, starting from a theoretical structural model of the phases identified during qualitative analysis of the diffraction profiles. The fundamental data of the phases used for refinement of the diffraction profiles for the samples of clinker according to the invention are summarized in Table 2:

TABLE 2

| Name | Space group and n° international tables* | Cell parameters | ICSD reference** | Bibliographic reference |
|---|---|---|---|---|
| α'$C_2S$ | Orthorhombic Pnma (61) | a = 6.8709(4) b = 5.6010(4) c = 9.5563(7) V = 367.8 Z = 4 | 82997 | Mumme, W., Cranswick, L., Chakoumakos, B' Neues Jahrbuch fuer Mineralogie. Abhandlungen, 169, 1, 35-68 (1995) |
| β $C_2S$ | Monoclinic P21/n (14) | a = 5.502(1) b = 6.745(1) c = 9.297(1) beta = 94.59(2) V = 343.9 Z = 4 | 963 | Jost, K.H., Ziemer, B., Seydel, R. Acta Crystallographica B, 33, 1696-1700 (1977) |
| $C_4A_3\$$ | Orthorhombic Pcc2 (27) | a = 13.028(3) b = 13.037(3) c = 9.161(2) V = 1555.96 Z = 4 | 80361 | Calos, N.J., Kennard, C.H.L., Whittaker, A.K., Davis, R.L. Journal of Solid State Chemistry (1995) 119 1-7 |
| $C_4A_3\$$ | Cubic I4132 (214) | a = 18.392 V = 6221.38 Z = 16 | 28480 | Saalfeld H, Depmeier W Kristall. Und Technik 7 (1972) |
| C$ | Orthorhombic Amma (63) | a = 6.993(2) b = 6.995(2) c = 6.245(1) V = 305.48 Z = 4 | 40043 | Hawthorne, F.C., Ferguson, R.B. Canadian Mineralogist, 13, 289-292 (1975) |
| CFT * | Orthorhombic Pcm21 (26) | a = 5.392 b = 11.473 c = 5.409 V = 334.7 Z = 2 | 203100 | Motzet & Poellmann Proceedings of the Twentieth International Conference On Cement Microscopy Apr. 19-Apr. 23, 1998 Guadalajara, Mexico 187-206 |
| Fluorellestadite 3$C_2S$3C$$CaF_2$ | Hexagonal P63/m (176) | a = 9.441(7) c = 6.939(3) V = 535.73 Z = 1 | — | Pajares I., De la Torre A.G., Martinez-Ramirez S., Puertas F.,; Blanco-Varela M.T., Aranda M.A.G. (2002); * Powder Diffraction, 17, 281-286; |
| Ternesite $C_5S_2\$$ | Orthorhombic Pcmn (62) | a: 10.182 b: 15.398 c: 6.85 V: 1073.96 Z: 4 | — | Brotherton, P.D., Epstein, J.M., Pryce, M.W., White, A.H., (1974), Aust. J. Chem., volume 27, 657 |
| Merwinite $CMS_2$ | Monoclinic P21/a (14) | a = 13.298 b = 5.304(6) c = 9.352 V= 659.26 Z = 4 | 26002 | P.B. Moore, T. Araki (1972); * Amer. Mineral., 57, 1355-1374 |

TABLE 2-continued

| Name | Space group and n° international tables* | Cell parameters | ICSD reference** | Bibliographic reference |
|---|---|---|---|---|
| Periclase | Cubic Fm3m (225) | a = 4.211(2) V = 74.68 Z = 4 | | Sasaki S., Fujino K., Takeuchi Y. (1979); * Proc. Jpn. Acad., 55, 43 |
| $C_{11}A_7CaF_2$ | Cubic I43d (220) | a = 11.9629 V = 1711.93 Z = 2 | 92042 | Costa U., Ballirano P., Powder Diffraction, 15 (2000) |

* International tables for Crystallography, Volume A, Ed. Kluwer
**Inorganic Crystal Structure Database (ICSD) - FIZ Karlsruhe & National Institute of Standards and Technology (NIST)

Example 2

Preparation of a Sulfo-Aluminous Clinker According to the Invention

To prepare a sulfo-aluminous clinker according to the invention, a mixture of limestone, silica, natural gypsum and alumina, this latter coming from the production cycle of secondary aluminium, was used as starting material.

The chemical composition of the starting materials is indicated in Table 3:

TABLE 3

| | Limestone | Gypsum | Silica | Alumina |
|---|---|---|---|---|
| Loss on ignition % | 41.53 | 19.9 | 0.38 | 15.64 |
| $SiO_2$ % | 1.56 | 4.25 | 95.04 | 6.20 |
| $Al_2O_3$ % | 3.95 | 1.95 | 1.91 | 63.39 |
| $Fe_2O_3$ % | 0.28 | 0.56 | 0.50 | 1.56 |
| CaO % | 51.28 | 28.00 | 0.11 | 1.85 |
| MgO % | 0.68 | 3.03 | <0.07 | 7.38 |
| $SO_3$ % | <10.06 | 39.2 | 0.17 | 0.14 |
| $Na_2O$ % | 0.18 | 0 | <0.08 | 1.29 |
| $K_2O$ % | 0.10 | 0.57 | 1.14 | 0.81 |
| SrO % | <0.03 | Nd | <0.03 | Nd |
| $Mn_2O_3$ % | <0.04 | Nd | 0.05 | Nd |
| $P_2O_5$ % | 0.12 | Nd | 0.04 | Nd |
| $TiO_2$ % | 0.13 | Nd | 0.55 | Nd |
| Cl— % | Nd | Nd | Nd | 0.36 |
| F— % | Nd | Nd | Nd | 0.95 |

Nd = not determined

Limestone, silica, natural gypsum and alumina were ground so that they could pass completely through a 90 micron sieve. The starting mixture was obtained by mixing the components, weighed in the proportions indicated in Table 4, with water to obtain a fluid mortar. After mixing for 30 minutes, the mixture obtained was poured into a receptacle, decanted and finally dried at 60° C. for 24 hours.

TABLE 4

| | |
|---|---|
| Limestone % | 41.0 |
| Gypsum % | 25.4 |
| Silica % | 0.7 |
| Alumina % | 32.9 |

The mixture thus obtained was placed in platinum crucibles and fired in an electric furnace.

The thermal process involved a pre-calcination stage at 950° C. for approximately 45 minutes, followed by a heating stage of approximately 1.5 hours until reaching the temperature of 1200° C. After reaching this temperature, it was maintained for approximately 1 hour.

The clinker thus produced was characterized according to the description of Example 1.

Table 5 indicates the composition of the phases of the clinker. Table 6 indicates the chemical composition of the clinker. Table 7 indicates the corresponding results of the elemental microanalysis.

TABLE 5

| Main phases | |
|---|---|
| $C_4A_3\$$ orthorhombic % | 61.2 |
| β $C_2S$ % | 14.8 |
| Fluorellestadite - $3C_2S3C\$CaF_2$ % | 9.6 |
| $C_{11}A_7CaF_2$ % | 2.9 |
| Additional phases | |
| Anhydrite (C$) % | 2.9 |
| CFT % | 1.5 |
| Periclase % | 4.7 |

TABLE 6

| | |
|---|---|
| Loss on ignition % | 0.44 |
| Free lime* % | 0.14 |
| F— % | 0.69 |
| Cl % | 0.33 |
| $SiO_2$ % | 6.17 |
| $Al_2O_3$ % | 29.7 |
| $Fe_2O_3$ % | 1.17 |
| CaO % | 41.0 |
| MgO % | 3.20 |
| $SO_3$ % | 14.1 |
| $Na_2O$ % | 0.80 |
| $K_2O$ % | 0.55 |
| SrO % | 0.43 |
| $Mn_2O_3$ % | 0.16 |
| $P_2O_5$ % | 0.10 |
| $TiO_2$ % | 0.45 |

*determined according to the Franke method.

TABLE 7

| | Mg (%) | Al (%) | Si (%) | S (%) | Ca (%) | Ti (%) | Fe (%) | F (%) | Cl (%) |
|---|---|---|---|---|---|---|---|---|---|
| $C_4A_3\$$ | 0.8 | 43.5 | 0.8 | 9.0 | 45.1 | — | 0.9 | — | — |
| $C_2S$ | 0.5 | 2.1 | 24.0 | 1.9 | 70.0 | 0.6 | 0.5 | — | — |
| $3C_2S3C\$CaF_2$ | 0.0 | 0.7 | 14.4 | 14.8 | 66.1 | 0.1 | 0.0 | 3.9 | — |
| $C_{11}A_7CaCl_2$ | — | 32.5 | 3.1 | 1.9 | 55.7 | 0.0 | 4.7 | — | 2.1 |

Therefore, the clinker according to the invention proved to contain approximately 61% of $C_4A_3\$$, approximately 15% of $C_2S$ (exclusively in beta form), approximately 3% of anhydrite (C$), approximately 10% of fluorellestadite ($3C_2S$ $3C\$$

$CaF_2$), approximately 3% of $C_{11}A_7CaCl_2$ (as determined by means of SEM-EDS, see Table 7). It also contains periclase, $C_4AF$ and CFT.

The presence of phase $C_5S_2\$$ was not detected.

Example 3

Preparation of a Comparison Sulfo-Aluminous Clinker

To prepare the comparison sulfo-aluminous clinker, a mixture of limestone, silica and gypsum as described in example 2, but without alumina, was used as starting material. High grade calcined bauxite was used as source of $Al_2O_3$. The chemical composition of the bauxite used is indicated in Table 8.

TABLE 8

| | |
|---|---|
| Loss on ignition % | 0.67 |
| $SiO_2$ % | 4.96 |
| $Al_2O_3$ % | 87.79 |
| $Fe_2O_3$ % | 1.44 |
| CaO% | 0.67 |
| MgO % | 0.12 |
| $SO_3$ % | 0.01 |
| $Na_2O$ % | 0.12 |
| $K_2O$ % | 0.52 |
| SrO % | 0.00 |
| $Mn_2O_3$ % | 0.00 |
| $P_2O_5$ % | 0.00 |
| $TiO_2$ % | 0.00 |
| Cl— % | 0.00 |
| F— % | 0.00 |

The starting mixture was prepared as described in Example 1, weighing the raw materials in the proportions indicated in Table 9:

TABLE 9

| | |
|---|---|
| Limestone % | 44.9 |
| Gypsum % | 27.7 |
| Silica % | 1.7 |
| Bauxite % | 25.7 |

The preparation process was the following: pre-calcination stage at 950° C. for 45 minutes, firing stage up to 1330° C. for 2 hours and maintenance of this temperature for 1 hour.

The clinker thus produced was characterized as described in example 1.

The mineralogical composition of the clinker is indicated in Table 10. Table 11 indicates the chemical analysis. Table 12 gives the elemental microanalysis results:

TABLE 10

| | |
|---|---|
| $C_4A_3\$$ % | 65.7 |
| β $C_2S$ % | 8.7 |
| α' $C_2S$ % | 8.5 |
| Anhydrite (C$) % | 7.4 |
| $C_5S_2\$$ % | 5.5 |
| CFT % | 3.2 |
| Periclase % | 0.9 |

TABLE 11

| | |
|---|---|
| Loss on ignition % | 0.40 |
| Free lime* % | 0.10 |
| F— % | 0.08 |

TABLE 11-continued

| | |
|---|---|
| Cl % | 0.01 |
| $SiO_2$ % | 5.46 |
| $Al_2O_3$ % | 31.0 |
| $Fe_2O_3$ % | 0.83 |
| CaO % | 44.7 |
| MgO % | 0.55 |
| $SO_3$ % | 14.7 |
| $Na_2O$ % | 0.06 |
| $K_2O$ % | 0.37 |
| SrO % | 0.36 |
| $Mn_2O_3$ % | <0.04 |
| $P_2O_5$ % | 0.11 |
| $TiO_2$ % | 1.25 |

*determined according to the Franke method

TABLE 12

| | Mg (%) | Al (%) | Si (%) | S (%) | Ca (%) | Ti (%) | Fe (%) | Mn (%) | Zn (%) |
|---|---|---|---|---|---|---|---|---|---|
| $C_4A_3\$$ | 0.8 | 42.7 | — | 9.3 | 46.1 | 0.2 | 0.8 | — | — |
| $C_2S$ | 0.4 | 3.2 | 17.6 | 2.7 | 70.8 | 3.9 | 1.1 | — | — |
| CFT | 2.0 | 11.1 | 2.1 | 1.2 | 52.6 | 18.2 | 8.7 | 0.5 | 3.6 |

Therefore, the comparison clinker is composed of approximately 65% of $C_4A_3\$$, of approximately 17% of $C_2S$ in beta and alpha' forms, of approximately 7% of anhydrite (C$), of 3.2% CFT.

5.5% of phase $C_5S_2\$$ was also found.

Example 4

Preparation of Sulfo-Aluminous Cements

The sulfo-aluminous clinkers prepared according to the example 2 (invention) and 3 (comparison) were ground until obtaining a specific surface (Blaine method) of 4500 $cm^2$/g.

15% of a source of calcium sulfate, in this particular instance anhydrite, was added to the two clinkers.

Example 5

Comparative Tests on the Cements

The cements prepared according to example 4 were tested in mortar, according to the standard EN 196-1.

With regard to the setting times, these were determined according to the standard EN 196-3, but maintaining a fixed water/cement ratio of 0.35.

Table 13 indicates the results of the physical-mechanical tests performed on the samples of cement.

TABLE 13

| | clinker example 3 | clinker example 2 |
|---|---|---|
| Setting times (min) a/c = 0.35% | | |
| Initial | 31 | 15 |
| Final | 39 | 20 |
| Compression strength (MPa) | | |
| 3 h | 2.7 | 13.8 |
| 8 h | 8.3 | 26.4 |
| 24 h | 25.4 | 41.1 |
| 2 d | 46.9 | 46.8 |
| 7 d | 56.6 | 59.2 |
| 28 d | 60.8 | 63.8 |

Comparison of the performances shows a higher reactivity of the clinker produced according to the invention, which leads to cements with lower setting times and short term mechanical strengths that are decidedly higher than the comparison clinker of example 3.

Example 6

Effect of the Firing Temperature on the Final Clinker

The starting mixture used as described in example 2 to prepare the clinker according to the invention was subjected to firing at different temperatures, respectively 1000, 1100, 1200 and 1300° C., for 2 hours. The clinkers obtained were subjected to diffractometry analysis to determine the mineralogical composition, as described in example 1.

By comparing the diffraction profiles, as shown in the graphs of FIGS. 1 to 5 of the accompanying drawings, it was possible to establish that the firing temperature of the clinker according to the invention must not be above 1200° C. to obtain a clinker simultaneously containing $C_4A_3\$$, $C_{11}A_7CaX_2$ and $3C_2S\ 3C\$\ CaX_2$ and substantial absence of phase $C_5S_2\$$.

In the graphs of FIGS. 1 to 5, the scanning angle in 2-theta is indicated in the abscissae, while the intensity of the diffraction signal expressed in linear counts (Lin (Counts)) is indicated in the ordinates.

Figure 2:
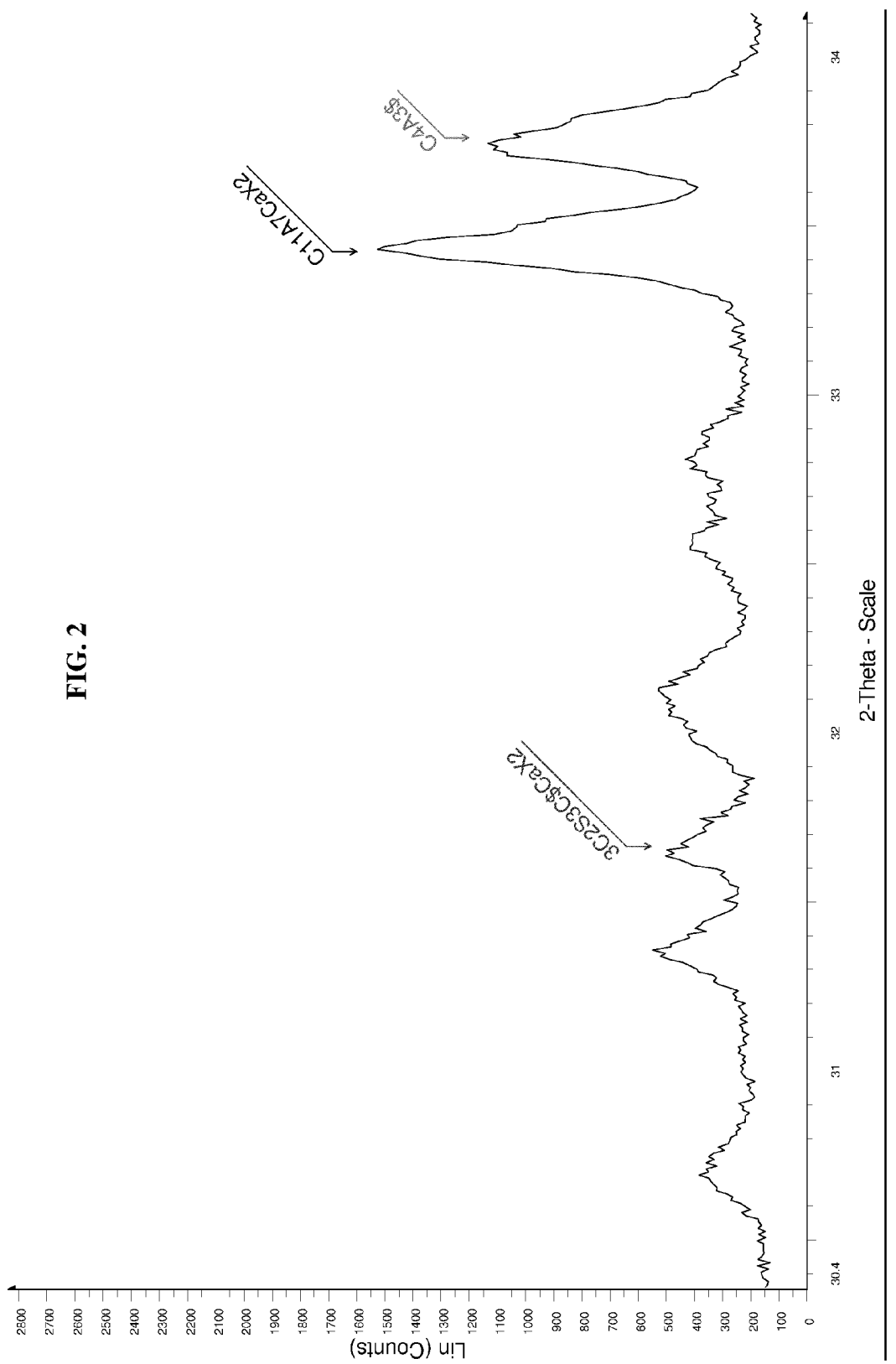
Figure 3:
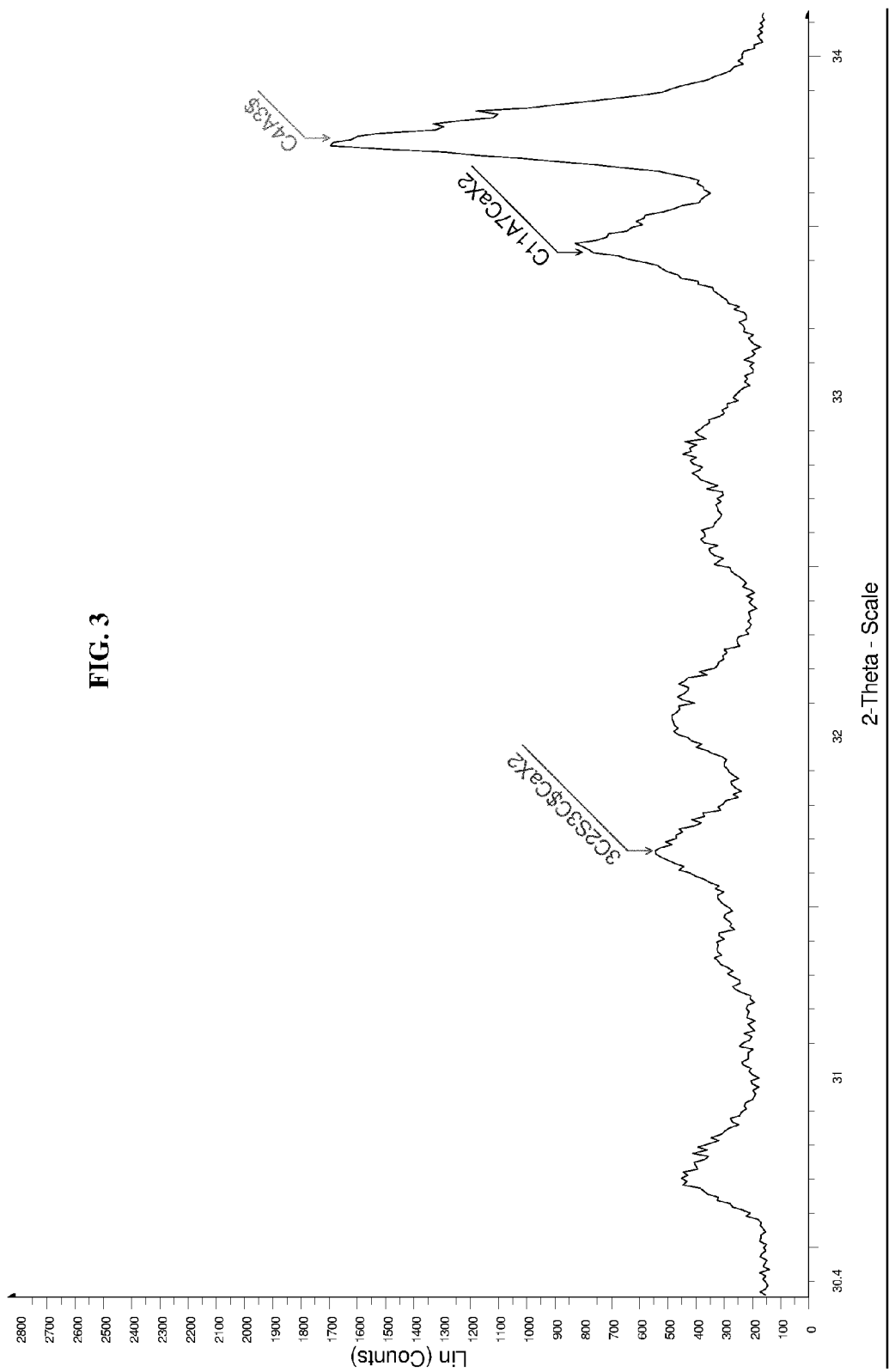

Examining the diffractograms of FIGS. 1, 2 and 3, it can be seen that at increasing temperatures up to 1200° C., precisely 1000° C. (FIG. 1), 1100° C. (FIG. 2), 1200° C. (FIG. 3), the relative content of the three main phases of the clinker produced is gradually modified. In particular, as the temperature increases from 1000 to 1200° C., the content of phase $C_4A_3\$$ increases and the content of phase $3C_2S\ 3C\$\ CaX_2$ decreases.

Figure 4:
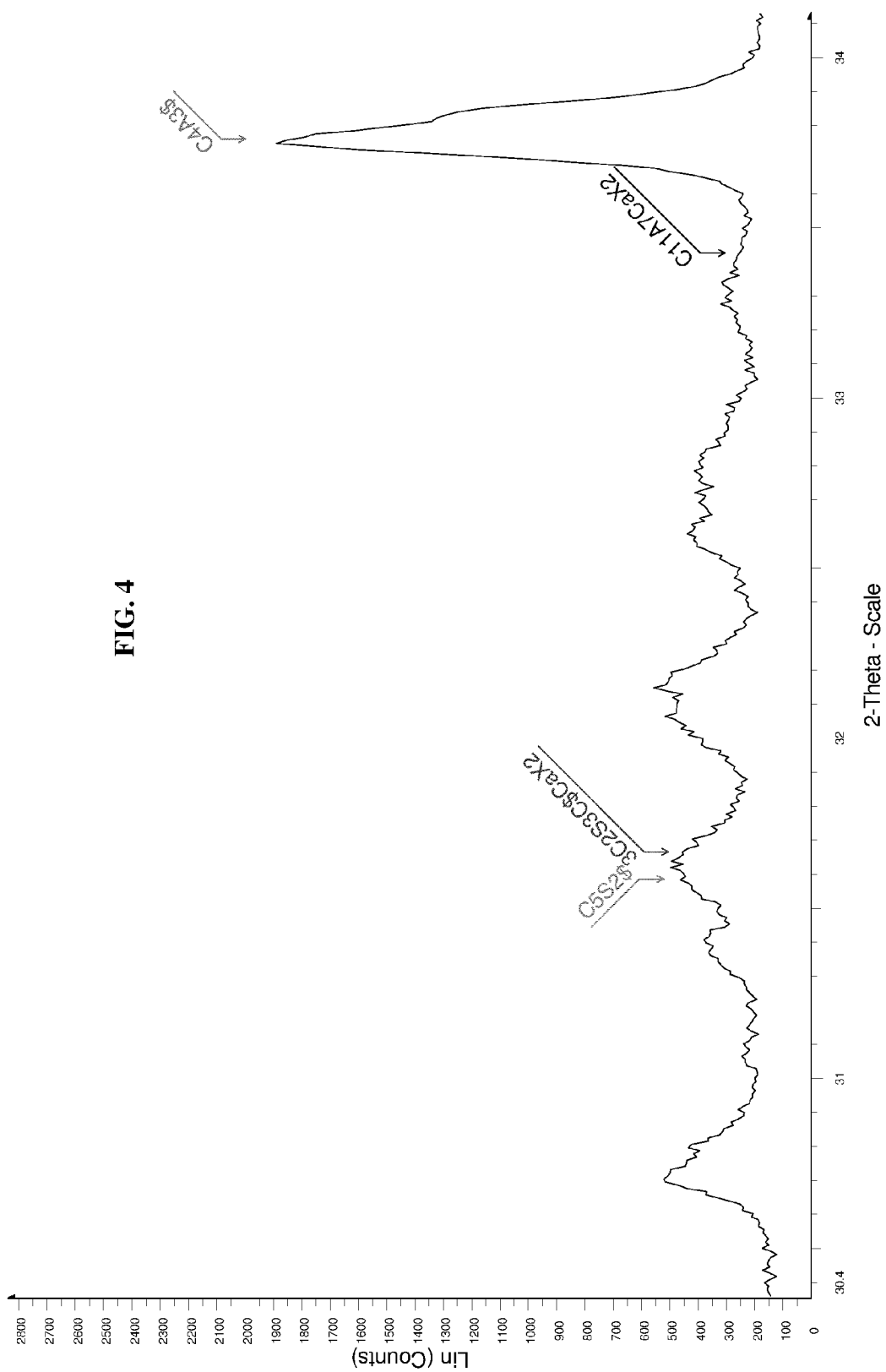
FIG. 4 shows the diffractogram of a comparison sample of clinker, not produced according to the invention.
Figure 5:
FIG. 5 shows the diffractograms of FIGS. 1 to 4 superimposed on one another in order to provide a synoptic framework of their comparison.

FIG. 4 instead shows that, operating at 1300° C., the phase $C_{11}A_7CaX_2$ is totally absent, the phase $3C_2S\ 3C\$\ CaX_2$ decreases drastically and the undesirable phase $C_5S_2\$$ appears, producing an unsuitable clinker according to the present invention.

As can be understood from the examples indicated above, the clinker according to the invention leads to hydraulic binders with low setting times and decidedly higher short term mechanical strengths compared to prior art sulfo-aluminous clinkers. In brief, fluorine and chlorine allow stabilization of the two phases characterizing the clinker of the invention, $3C_2S\ 3C\$\ CaX_2$ and $C_{11}A_7CaX_2$ at the expense of the phase $C_5S_2\$$, which is eliminated from the clinker.

The lower firing temperature and the possibility of starting with secondary alumina and not with bauxite makes it possible to protect the environment by reducing greenhouse gas emissions and consumption of natural raw materials, also solving the problem of disposal of waste from other industrial processes.

The invention claimed is:

1. A sulfo-aluminous clinker comprising a mixture of:
   (i) calcium sulfoaluminate ($C_4A_3\$$), in an amount greater than 50% by weight of said mixture,
   (ii) belite ($C_2S$) in an amount ranging from 2% to 23% by weight of said mixture;
   (iii) $3C_2S3C\$CaX_2$, wherein X is fluorine or chlorine, in an amount ranging from 3% to 15% by weight of said mixture; and
   (iv) $C_{11}A_7CaX_2$, wherein X is fluorine or chlorine, in an amount ranging from 2% to 12% by weight of said mixture;
   wherein both fluorine and chlorine are present in said mixture, and $C_5S_2\$$ is absent therefrom.

2. The sulfo-aluminous clinker of claim 1, comprising $3C_2S3C\$CaF_2$ and $C_{11}A_7CaCl_2$.

3. The sulfo-aluminous clinker of claim 2, further comprising $C_{11}A_7CaF_2$.

4. The sulfo-aluminous clinker of claim 1, wherein said total combined amount of $3C_2\$3C\$CaX_2$ and $C_{11}A_7CaX_2$ is from 5% to 25% of said mixture.

5. The sulfo-aluminous clinker of claim 1, comprising from 0.01 to 10% by weight of at least one of: calcium sulfate or anhydrite (C$), a calcium aluminate (CA, $CA_2$, $C_3At$), gehlenite ($C_2AS$), perovskite (CT), calcium iron titanate (CFT), merwinite ($CMS_2$), periclase, free lime, or ferrite ($C_4AF$ or $C_2F$).

6. The sulfo-aluminous clinker according to claim 2, comprising from 52% to 72% of calcium sulfoaluminate ($C_4A_3\$$), from 5% to 18% of belite ($C_2S$), from 6% to 12% of $3C_2S\ 3C\$\ CaF_2$, and from 2% and 8% of $C_{11}A_7CaCl_2$.

7. The sulfo-aluminous clinker according to claim 1, comprising from 30% to 45% CaO, from 20-35% $Al_2O_3$, from 0.1-5% $Fe_2O_3$, from 5 to 10% $SiO_2$, from 10-18% $SO_3$, from 0.1-6% MgO, from 0.1-3% $TiO_2$, from 0.05-1% $Na_2O$, from 0.05-1% $K_2O$, from 0.05-5% $P_2O_5$, and from 0.05-1% SrO.

8. The sulfo-aluminous clinker of claim 1, comprising from 0.01% to 1% fluorine and from 0.1% to 1% chlorine.

9. A hydraulic binder comprising the sulfo-aluminous clinker of claim 1 and at least one of calcium oxide and calcium sulfate.

10. A method for producing sulfo-aluminous clinker according to claim 1, comprising the stage of subjecting a bauxite-free mixture, comprising a source of lime (CaO), of sulfate ($SO_3$), alumina ($Al_2O_3$) and a source of F and Cl, to firing at a temperature not above 1200° C.

11. The method of claim 10, wherein said alumina is from production of secondary aluminium.

12. The method of claim 10, wherein said mixture comprises limestone, silica, natural gypsum and alumina.

13. The method of claim 10, wherein said source of F and Cl is said alumina.

14. The method of claim 10, wherein said source of F and Cl is selected from the group consisting of fluorite, calcium chloride, sodium chloride, potassium chloride and mixtures thereof.

15. The method of claim 10, wherein said mixture comprises at least one dolomite, marl, clay, kaolin, chemical gypsum, phosphogypsum, fluorogypsum and fluorite.

16. The method of claim 10, comprising firing said mixture in a rotary kiln.

17. The method according to claim 10, wherein said mixture is pre-calcinated prior to firing.

18. The method of claim 17, further comprising:
   a) grinding limestone, silica, natural gypsum and alumina to a determined grain-size distribution,
   b) mixing (a) with water to obtain a fluid mortar,
   c) drying said mortar,
   d) subjecting said dried mortar to pre-calcination at a temperature of 950° C., and
   e) subjecting the pre-calcined mixture to firing at a temperature not above 1200° C., to obtain said sulfo-aluminous clinker.

* * * * *